United States Patent
Shoji

[19]

[11] Patent Number: 5,804,927
[45] Date of Patent: Sep. 8, 1998

[54] LIGHT EMITTING APPARATUS FOR A BICYCLE

[75] Inventor: Masao Shoji, Osaka, Japan

[73] Assignee: Cat Eye Co., Ltd., Osaka, Japan

[21] Appl. No.: 538,587

[22] Filed: Oct. 3, 1995

[30] Foreign Application Priority Data

Oct. 5, 1994 [JP] Japan ..................................... 6-241341

[51] Int. Cl.$^6$ ..................................................... G05F 1/00
[52] U.S. Cl. ...................... 315/291; 315/200.1; 315/293; 340/527; 362/800
[58] Field of Search .............................. 315/200 A, 174, 315/291, 293; 340/432, 473, 331, 321, 527, 530, 555; 362/800, 83.3, 157

[56] References Cited

U.S. PATENT DOCUMENTS

| | | | |
|---|---|---|---|
| 4,156,166 | 5/1979 | Shapiro et al. | 315/209 R |
| 4,654,629 | 3/1987 | Bezos et al. | 315/200 A X |
| 4,885,508 | 12/1989 | Krokaugger | 315/287 |
| 5,175,528 | 12/1992 | Choi et al. | 315/200 A X |
| 5,313,187 | 5/1994 | Choi et al. | 315/200 A X |
| 5,313,188 | 5/1994 | Choi et al. | 315/200 A X |

FOREIGN PATENT DOCUMENTS

| | | |
|---|---|---|
| A 0163969 | 11/1985 | European Pat. Off. . |
| A 0401911 | 12/1990 | European Pat. Off. . |
| A1 3518291 | 11/1986 | Germany . |
| A1 3435287 | 12/1986 | Germany . |
| 60-21919 | 6/1985 | Japan . |

OTHER PUBLICATIONS

Denshigaku Genri, *Principles of Electronics*, p. 831, 1993.
*Linear Circuit Data Book 1990* (Japanese version), Texas Instruments, pp. 10–47–10–50.

*Primary Examiner*—Robert Pascal
*Assistant Examiner*—Haissa Philogene
*Attorney, Agent, or Firm*—Banner & Witcoff, Ltd.

[57] ABSTRACT

A light emitting apparatus for a bicycle includes a pulse generator for generating pulses having a predetermined period and a predetermined duty cycle, a light emitter for emitting light when a voltage is applied, and a voltage applying apparatus for applying a voltage to the light emitting apparatus in response to the generated pulses, and the pulse generator generates pulses which allows the light emitted from the light emitter to be visually recognized as light continuously emitted, by a person. Namely, the voltage is applied intermittently to the light emitter, such that the light emission by the light emitter can be visually recognized as light continuously emitted. Therefore, by the light emitting apparatus for the bicycle, brighter light can be emitted and power consumption by the circuit as a whole can be reduced, as compared with the prior art.

8 Claims, 9 Drawing Sheets

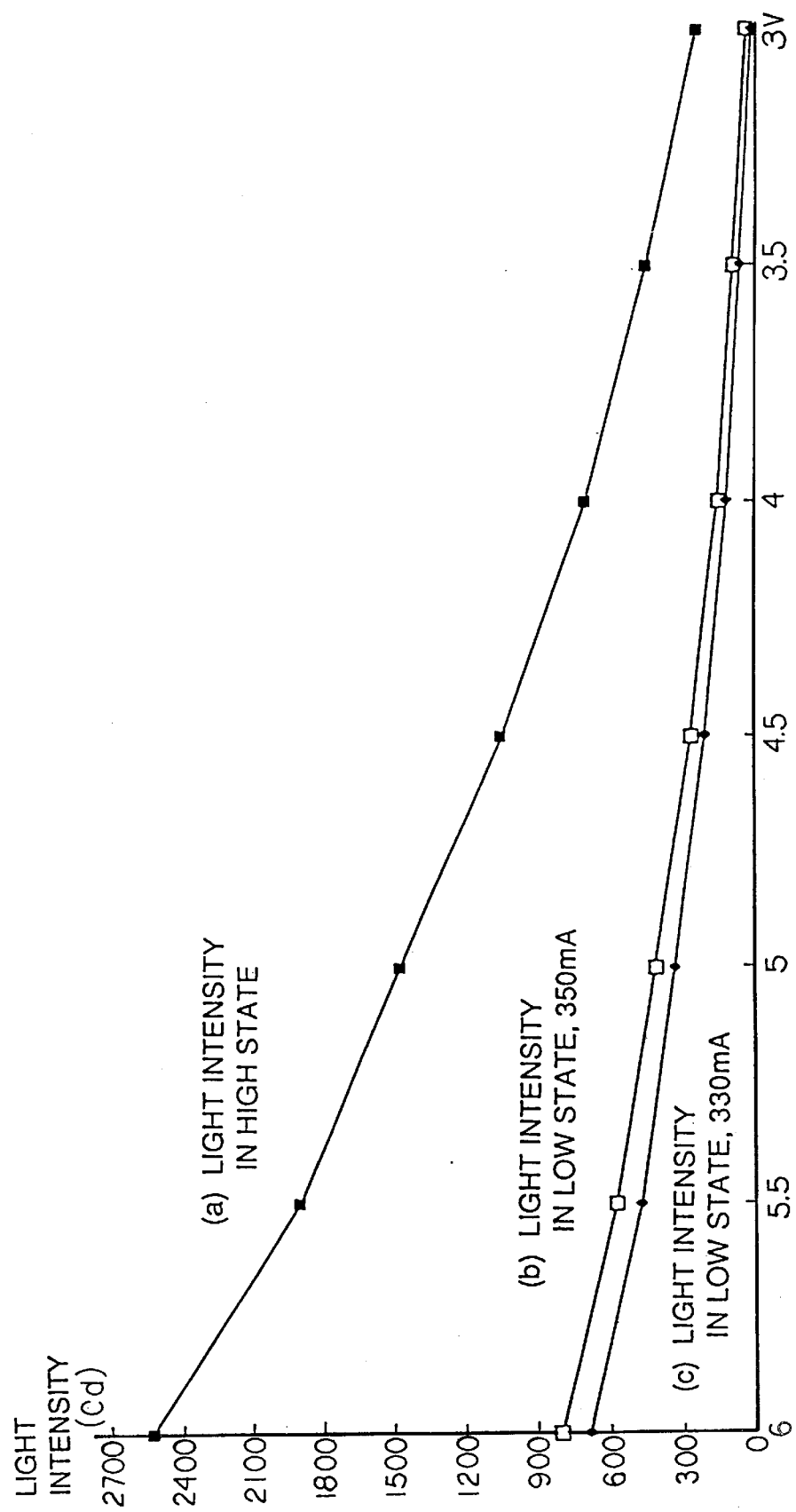

LIGHT EMITTING APPARATUS FOR A BICYCLE

BACKGROUND OF THE INVENTION

1. Field of the Invention

The present invention relates to a light emitting apparatus used for a bicycle and, more specifically, to an illuminating apparatus using a battery, used for a head lamp or a safety lamp of a bicycle.

2. Description of the Related Art

FIG. 13 is a circuit diagram of a conventional illuminating apparatus for a bicycle using a battery.

Referring to FIG. 13, in the conventional illuminating apparatus for a bicycle, a power supply E, a switch SW, a bulb L and a resistance R are connected in series. Resistance R is connected in order to limit the current flowing through the circuit and to elongate the life of the battery. The bulb L is turned on/off in accordance with on/off of the switch SW.

However, in the conventional illuminating apparatus for a bicycle, much power is consumed by the resistance R, and the light intensity of the bulb is not so high as compared with the consumed power.

For example, in order to light a halogen lamp of 4.8 V—0.5A by a current of 330 mA using power supply of 6 V, a resistor of 12.7 Ω is used as the resistance R. At this time, the halogen lamp is lit with the voltage of 1.6 V and consumes the power of 0.53 W. By contrast, a voltage of 4.4 V is applied to the resistor and it consumes the power of 1.45 W, which is larger than that of the halogen lamp.

SUMMARY OF THE INVENTION

The present invention was made to solve the above described problem, and its object is to provide a light emitting apparatus which consumes less power and emits brighter light.

Another object of the present invention is to provide a light emitting apparatus for a bicycle which does not affect other equipments of the bicycle by the noise therefrom.

A still further object of the present invention is to provide a light emitting apparatus for a bicycle of which light intensity can be controlled.

The light emitting apparatus for a bicycle in accordance with the present invention includes a pulse generator for generating pulses having a predetermined period and a predetermined duty cycle, a light emitter for emitting light when voltage is applied, and a voltage applying means responsive to the generated pulse for applying a voltage to the light emitting apparatus, and the pulse generator generates such pulses that cause light emission from the light emitter to be visually recognized by a person as continuous light emission.

More specifically, according to the present invention, the voltage is intermittently applied to the light emitter such that the emission of light by the light emitter can be visually recognized by a person as continuous light emission.

Therefore, the light emitting apparatus for a bicycle provides brighter light emission as compared with the prior art, while power consumption by the circuit as a whole can be reduced.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a graph showing light intensity of the illuminating apparatus shown in FIG. 1.

DESCRIPTION OF THE PREFERRED EMBODIMENTS (First Embodiment)

Figure 7:
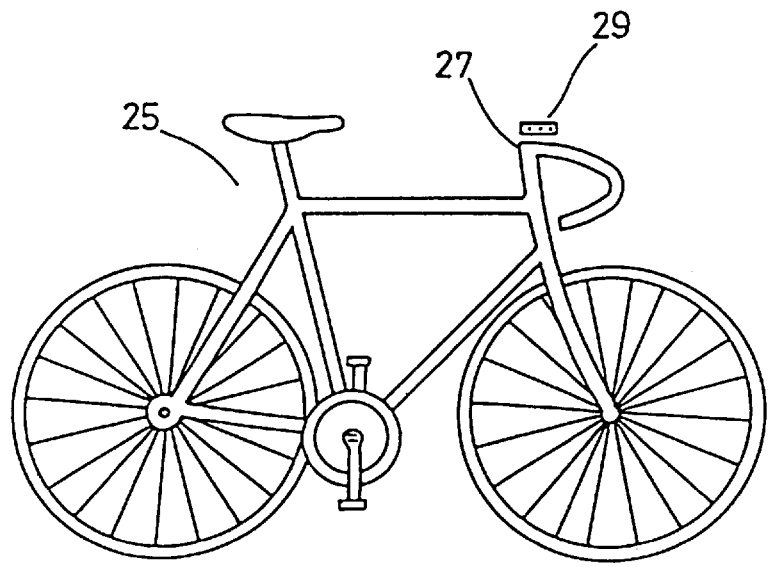
FIG. 7 shows the illuminating apparatus for a bicycle in accordance with the embodiment of the present invention attached to a bicycle.

FIG. 7 is a side view showing the illuminating apparatus for a bicycle in accordance with the first embodiment of the present invention attached to a bicycle.

Referring to the figure, the illuminating apparatus 29 for a bicycle is attached on a handle 27 which is one of the components of a bicycle 25.

Figure 8:
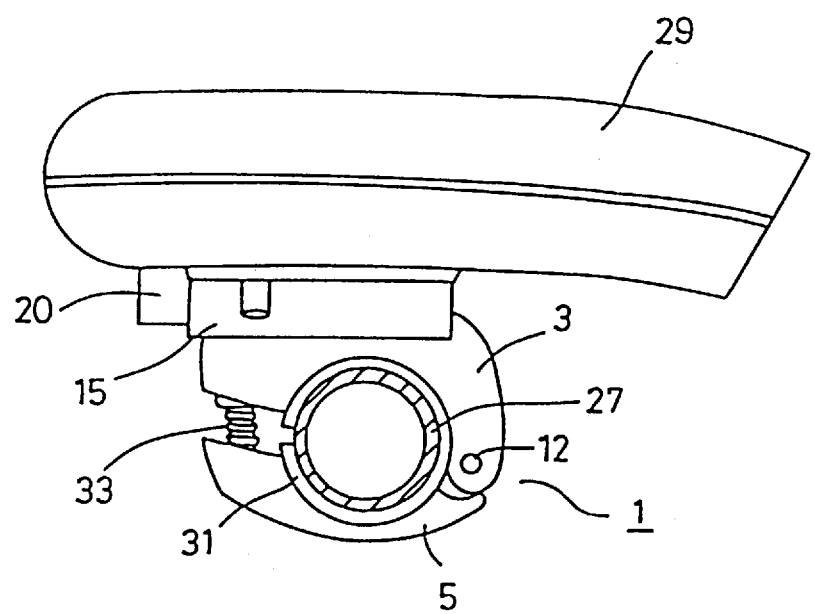
FIGS. 8 to 10 show appearance of the illuminating apparatus for a bicycle.

FIG. 8 is a side view showing, in enlargement, the illuminating apparatus 29 for a bicycle shown in FIG. 7.

Figure 9:
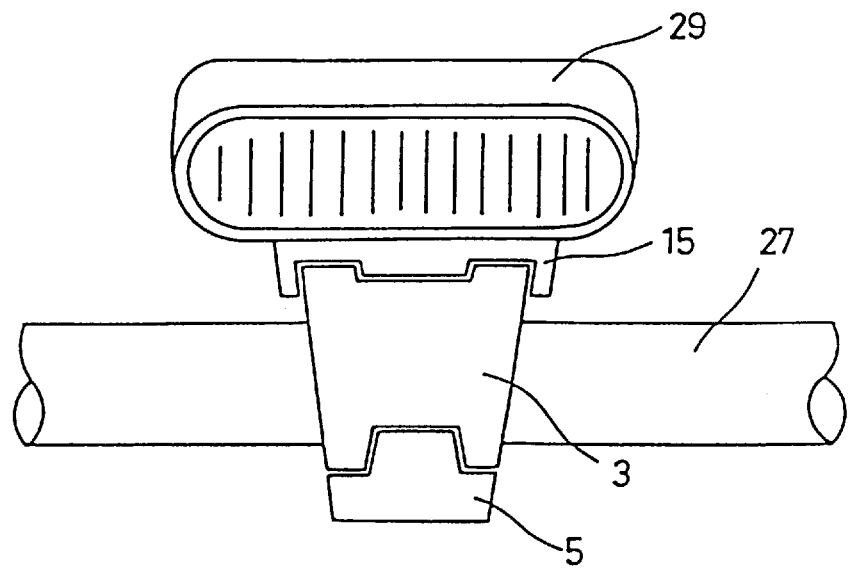
Figure 10:
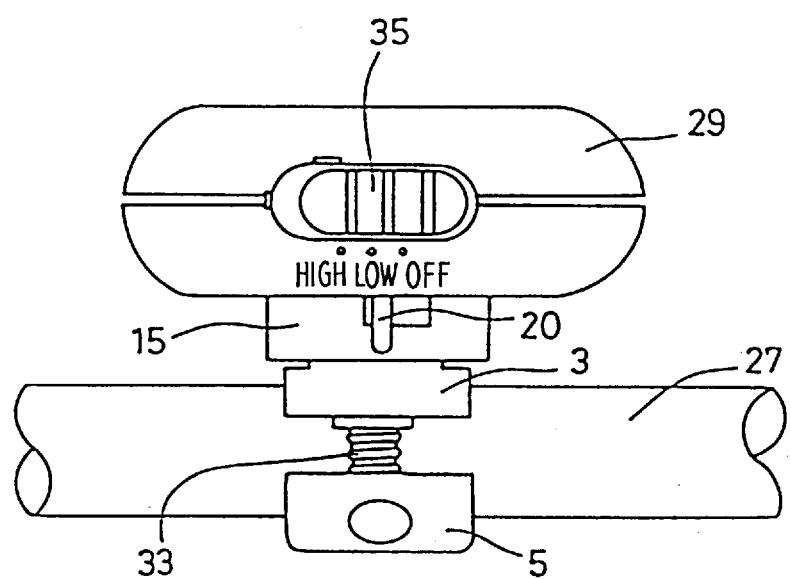

FIG. 9 is a front view and FIG. 10 is a rear view of the apparatus.

In these figures, the illuminating apparatus 29 for a bicycle is attached on a handle 27 by means of an attachment part 1. Attachment part 1 consists of an upper member 3 and a lower member 5 which are rotatable around a pin 12. When it is to be attached on a handle 27 of a bicycle, attachment screw 33 is removed, upper member 3 and lower member 5 are rotated around the pin 12 with its end portions expanded, and attachment part 1 is attached on handle 27 of the bicycle around which a rubber 31 is wound, with the attachment part 1 gripping the rubber. By fastening the attachment screw 33 thereafter, a force is applied to the upper and lower members 3 and 5 for gripping handle 27, and hence attachment part 1 is firmly attached on handle 27 with rubber 31 interposed.

At a rear portion of illuminating apparatus 29, a switching knob 35 for turning on/off the lamp is provided. At a lower portion of the illuminating apparatus 29, an attachment part 15 is attached by means of an attachment screw or the like. At a rear portion of attachment part 15, a lever 20 used for attachment/detachment to and from the attachment part 1 is provided.

Referring to FIG. 10, by the switching knob 35, the user can switch the lamp to a "High" state in which bright light is emitted, and a "Low" state in which light not so bright as in "High" state is emitted.

Figure 1:
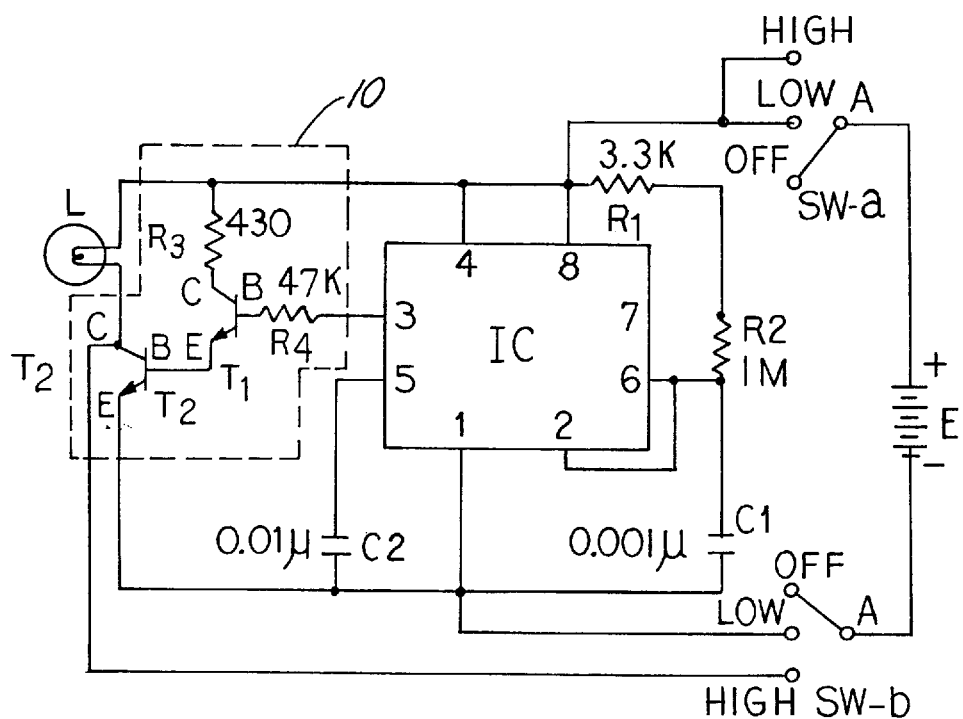
FIG. 1 is a circuit diagram of the illuminating apparatus for a bicycle in accordance with a first embodiment of the present invention.

FIG. 1 is a circuit diagram of a light emitting circuit included in the illuminating apparatus for a bicycle shown in FIGS. 7 to 10.

Referring to FIG. 1, the illuminating apparatus for a bicycle includes a semiconductor integrated circuit IC, a halogen lamp L, a power supply E, linked switches SW-a and SW-b, bipolar transistors $T_1$ and $T_2$, resistances $R_1$ to $R_4$, and capacitors $C_1$ and $C_2$.

The semiconductor integrated circuit IC is a general purpose timer IC, which is described as SE.SA.NE.555/556 in *Linear Circuit Data Book* 1990 (Japanese version), published by Texas Instruments.

Referring to FIG. 1, a +terminal of power supply E is connected to a terminal A of switch SW-a, and a —terminal of power supply E is connected to a terminal A of switch SW-b. In accordance with the state of use, terminal A of each of the switches SW-a and SW-b is connected to an OFF terminal, a LOW terminal or a HIGH terminal of each of the switches SW-a and SW-b. The switches SW-a and SW-b are linked switches, and therefore the OFF state, HIGH state and LOW state of switches SW-a and SW-b always coincide with each other. The switches SW-a and SW-b are switched as switch knob 35 in FIG. 10 is moved.

The HIGH terminal and the LOW terminal of switch SW-a are both connected to the eighth pin of semiconductor integrated circuit IC. The HIGH terminal of switch SW-b is connected to a collector C of bipolar transistor $T_2$, and the LOW terminal is connected to the first pin of semiconductor integrated circuit IC. The fourth and eighth pins of the semiconductor integrated circuit IC are connected to each other, and the second and the sixth pins of the circuit IC are connected to each other. The seventh and the eighth pins of semiconductor integrated circuit IC are connected with a resistance $R_1$ interposed. The sixth and the seventh pins of the semiconductor integrated circuit IC are connected with resistance $R_2$ interposed. The fourth pin of the semiconductor integrated circuit IC is connected to the collector C of bipolar transistor $T_1$ with resistance $R_3$ interposed. The third pin of the semiconductor integrated circuit IC is connected to the base B of bipolar transistor $T_1$ with resistance $R_4$ interposed. The sixth pin of the semiconductor integrated circuit IC is connected to an emitter E of bipolar transistor $T_2$ with a capacitor $C_1$ interposed. The fifth pin of the semiconductor integrated circuit IC is connected to the emitter E of bipolar transistor $T_2$ with a capacitor $C_2$ interposed. The emitter E of bipolar transistor $T_1$ is connected to the base B of bipolar transistor $T_2$. The fourth pin of semiconductor integrated circuit IC is connected to the collector C of bipolar transistor $T_2$ with a halogen lamp L interposed.

The operation of the circuit shown in FIG. 1 will be described.

When the linked switches SW-a and SW-b are off, halogen lamp L is not lit, as the voltage is not applied.

When the linked switches SW-a and SW-b are at the HIGH state, a circuit connecting power supply E and halogen lamp L in series is formed, and halogen lamp L is lit with the voltage of power supply E.

When the linked switches SW-a and SW-b are at the LOW state, semiconductor integrated circuit IC operates as an astable multivibrator, and pulses having the period determined by resistances $R_1$, $R_2$ and capacitor $C_1$ are output from the third pin. The pulses are amplified by bipolar transistors $T_1$ and $T_2$, so as to turn on the halogen lamp L. As the period of the pulses is short, light emission from the halogen lamp L is visually recognized as light emitted continuously.

Figure 2:
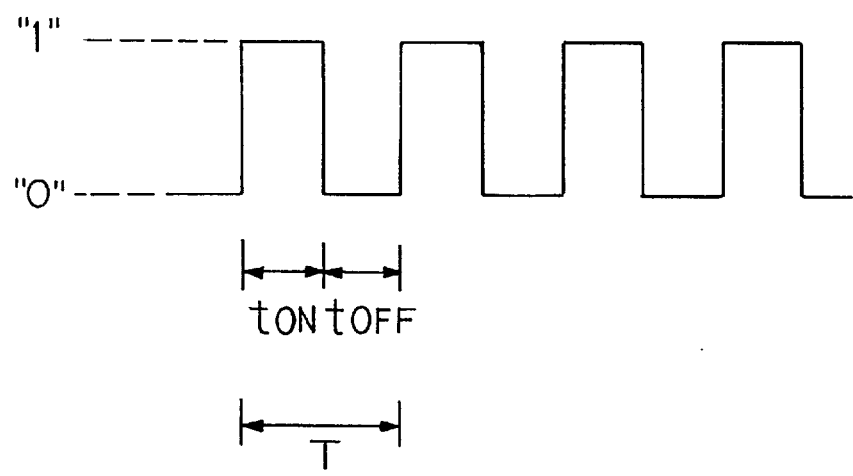
FIG. 2 is a timing chart showing an output from a third pin of a semiconductor integrated circuit IC shown in FIG. 1.

FIG. 2 is a timing chart showing the output from the third pin of the semiconductor integrated circuit IC shown in FIG. 1.

The time period $t_{ON}$ in which the output from the third pin of the semiconductor integrated circuit IC is "1" and the time period $t_{OFF}$ in which it is "0" are determined in accordance with the equations (1) and (2), based on the resistance values of resistances $R_1$ and $R_2$ and the capacitance of capacitor $C_1$ of the circuit shown in FIG. 1.

$$t_{ON}=0.693 \cdot (R_1+R_2) \cdot C_1 \qquad (1)$$

$$t_{OFF}=0.693 \cdot R_2 \cdot C_1 \qquad (2)$$

Since $t_{ON}+t_{OFF}$=period T, the duty cycle D (ratio of $t_{ON}$ with respect to the period T) is represented by the equation (3).

$$D=t_{ON}/(t_{ON}+t_{OFF})=(R_1+R_2)/(R_1+2 \cdot R_2) \qquad (3)$$

As described above, in the circuit of the present embodiment, the duty cycle can be changed within the range of from 50 to 100% by changing the resistance values $R_1$ and $R_2$ appropriately.

For example, when the values are set to $R_1$=3.3K [Ω], $R_2$=1M [Ω] and $C_1$=0.001 $\mu$ [F], then the circuit of the present embodiment operates with the pulse frequency f of f≒equal 700 Hz, pulse period T of T≒1.42 mS, $t_{OFF}$ 0.73 mS, duty cycle D=48% and average current I flowing through the circuit I≒330 mA.

Table 1 shows light intensity (unit: cd) when the halogen lamp L is lit with different voltages and different currents and FIG. 3 is a graph corresponding to Table 1.

In the graph, (a) shows light intensity when the halogen lamp L is directly connected to the power supply (for example, HIGH state of the circuit shown in FIG. 1). The light intensity at 330 mA shown by (c) indicates the light intensity of the halogen lamp when it is lit with the power supply voltage of 6 V and the average current of 330 mA, utilizing the LOW state of the circuit shown in FIG. 1. The light intensity at 350 mA shown by (b) represents the light intensity when the halogen lamp is lit with the power supply voltage of 6 V and the average current of 350 mA, with the values of resistances $R_1$ and $R_2$ set arbitrarily, utilizing the LOW state of the circuit shown in FIG. 1.

Figure 13:
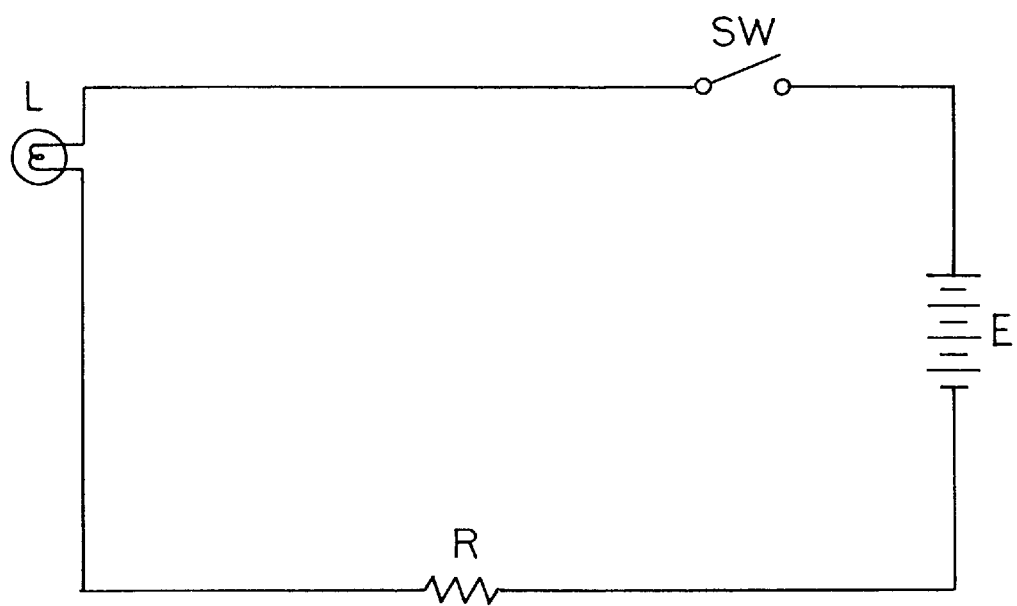
FIG. 13 is a circuit diagram of a conventional illuminating apparatus for a bicycle.

Referring to Table 1, the brightness at 330 mA with resistance represents brightness of the halogen lamp when it is lit with the current of 330 mA by using the circuit of the conventional illuminating apparatus shown in FIG. 13 (in that case, a resistor of 12.7 Ω must be used as the resistance R).

Referring to Table 1, when the halogen lamp is lit with the current of 330 mA using the power supply of 6 V, the light intensity as low as 18 (cd) is obtained by the conventional circuit, while light intensity as high as 680 (cd) can be obtained by the circuit in accordance with one embodiment of the present invention.

TABLE 1

| Voltage (V) | Light Intensity (cd) When directly connected (High state) | Light Intensity (cd) at 330 mA (6.0 V) (Low state) | Light Intensity (cd) at 350 mA (6.0 V) (Low state) | Light Intensity (cd) at 330 mA (6.0 V) with Resistance |
|---|---|---|---|---|
| 6 | 2529 | 680 | 801 | 18 |
| 5.5 | 1894 | 474 | 573 | — |
| 5 | 1466 | 329 | 407 | — |
| 4.5 | 1044 | 207 | 265 | — |
| 4 | 700 | 120 | 158 | — |
| 3.5 | 443 | 55 | 84 | — |
| 3 | 244 | 17 | 38 | — |

Figure 4A:
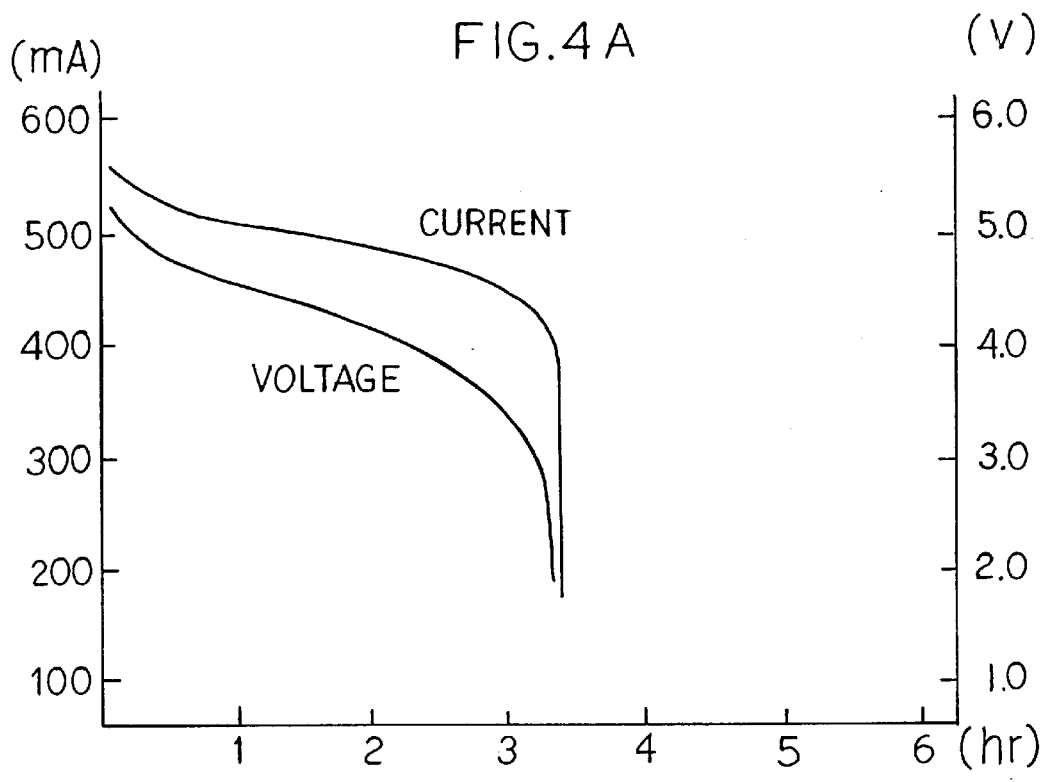
FIGS. 4A and 4B are graphs showing, for comparison, battery life when a halogen lamp is directly connected to the battery and when the halogen lamp is connected to the battery with the circuit of the illuminating apparatus shown in FIG. 1 interposed.
Figure 4B:
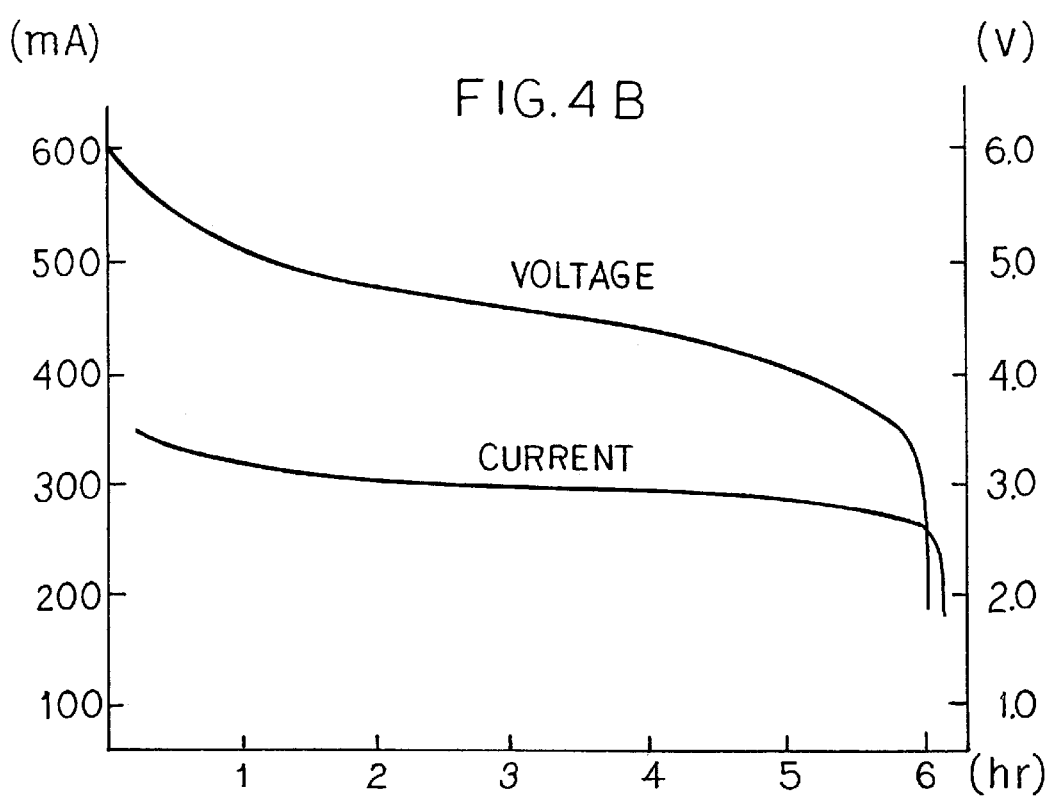

FIGS. 4a and 4b are graphs showing battery life, for comparison, when the halogen lamp is directly connected to the battery and when the halogen lamp is connected to the battery with the circuit of FIG. 1 in the LOW state interposed.

FIG. 4a is a graph showing the battery voltage and current drop with time, when the halogen lamp is directly coupled to four AA batteries of 1.5 V. In this example, the battery life (until the battery voltage and current plummet down) is about 3.5 hours.

FIG. 4b is a graph showing the battery voltage and current drop with time, when the halogen lamp is connected to the battery with the circuit of FIG. 1 in the LOW state interposed. In this example, the battery life is about 6 hours.

As described above, by using the circuit of the present invention, the battery life can be elongated as compared when the halogen lamp is directly connected.

(Second Embodiment)

Figure 5:
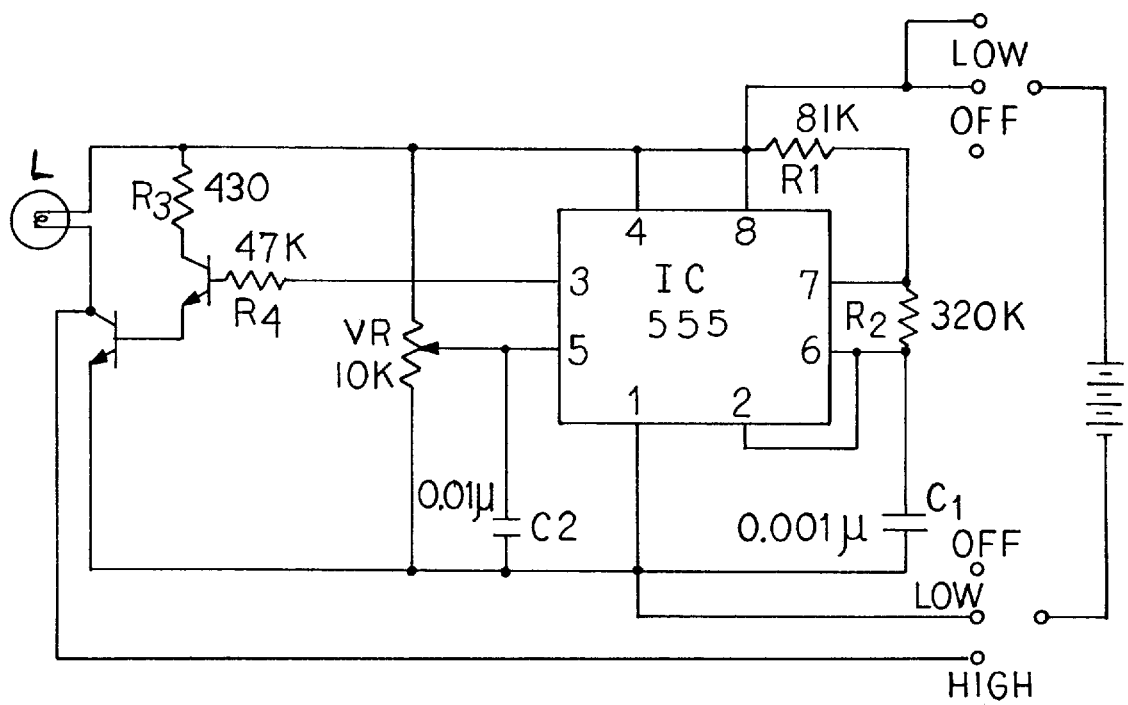
FIG. 5 is a circuit diagram of an illuminating apparatus for a bicycle in accordance with a second embodiment of the present invention.

FIG. 5 is a circuit diagram of the illuminating apparatus for a bicycle in accordance with a second embodiment of the present invention.

The circuit of the present embodiment includes, in addition to the circuit of FIG. 1, a variable resistor VR for applying a pulse duty-control voltage to the fifth pin of the semiconductor integrated circuit IC.

In the illuminating apparatus in accordance with the present invention, the duty cycle of the pulses output from the third pin of the semiconductor integrated circuit IC can be changed by changing the resistance value of the variable resistance VR, and hence brightness can be controlled.

Figure 6:
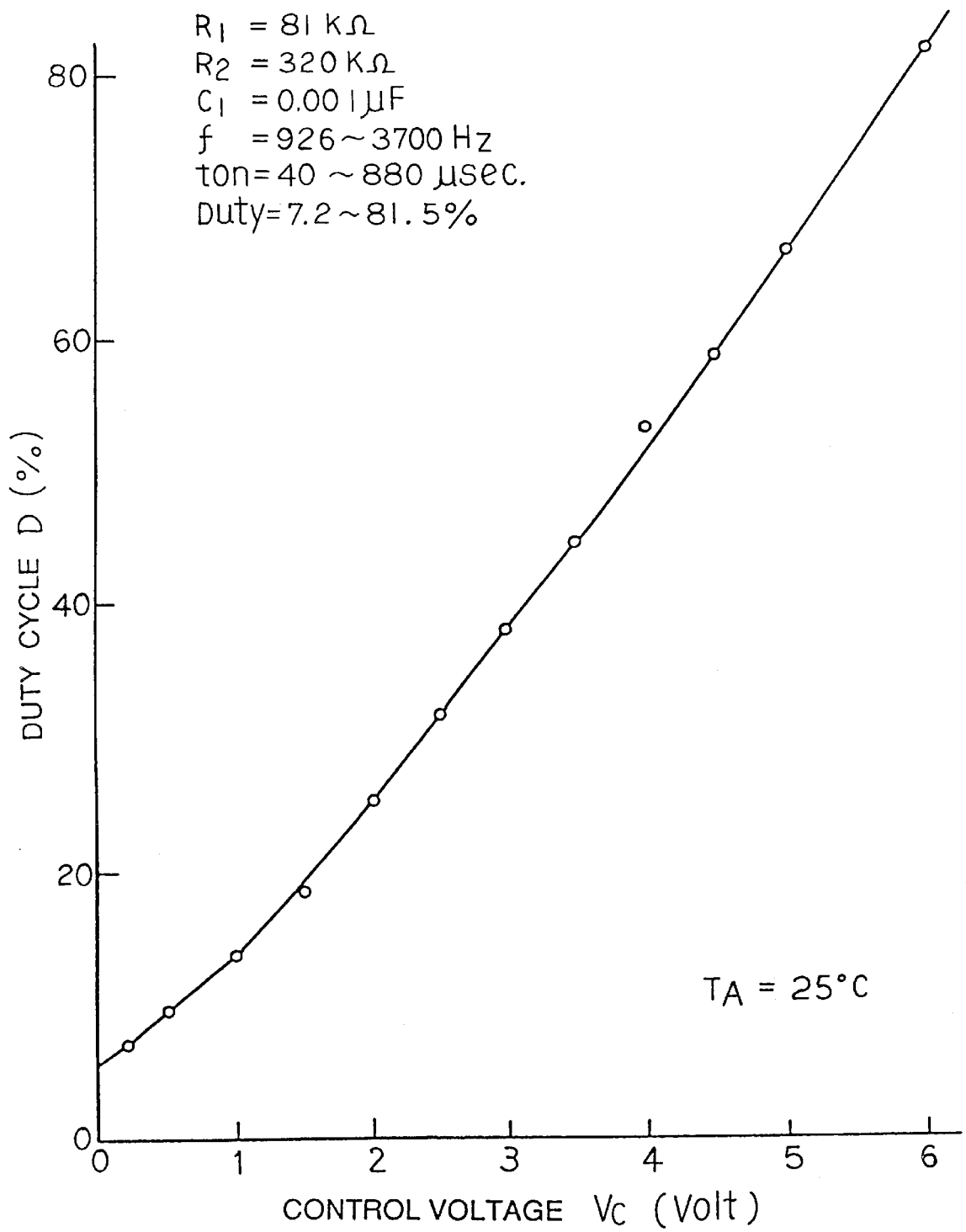
FIG. 6 is a graph showing relation between a control voltage Vc input to a fifth pin of the semiconductor integrated circuit IC and duty cycle of the pulse output from the third pin of the semiconductor integrated circuit IC in the second embodiment of the present invention.

FIG. 6 is a graph showing the control voltage Vc input to the fifth pin of the semiconductor integrated circuit IC and the duty cycle D of the pulses output from the third pin of the semiconductor integrated circuit IC in the second embodiment of the present invention.

The conditions for the example shown in the graphs are as follows: $R_1=81K$ [Ω], $R_2=320K$ [Ω], $VR=10K$ [Ω] and $C_1=0.001\mu$ [F].

By changing the value of the variable resistance VR, the control voltage also changes, and accordingly, pulse frequency f changes within the range of from 926 to 3700 Hz, $t_{ON}$ changes from $40\mu$ to 880 μsec, and the duty cycle D changes from 7.2% to 81.5%. Thus, in the present embodiment, brightness of the halogen lamp can be adjusted by changing the pulse duty.

(Third Embodiment)

Figure 11:
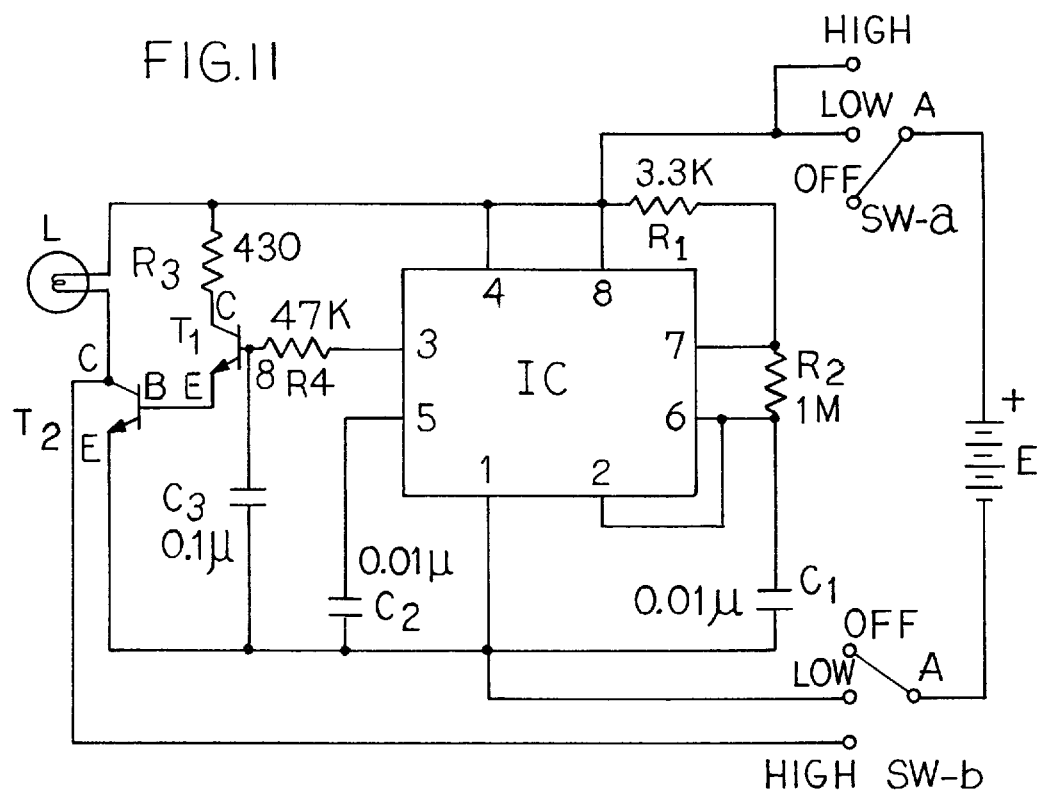
FIG. 11 is a circuit diagram of the illuminating apparatus for a bicycle in accordance with a third embodiment of the present invention.

FIG. 11 is a circuit diagram of an illuminating apparatus for a bicycle in accordance with a third embodiment of the present invention.

The appearance of the illuminating apparatus for a bicycle in accordance with this embodiment is the same as the first embodiment shown in FIGS. 8 to 10, and therefore description thereof is not repeated.

As compared with the circuit of FIG. 1, the circuit of the present invention differs in that the capacitance of capacitor $C_1$ is set to be 0.01 μF, and a capacitor $C_3$ having a capacitance of 0.1 μF is connected between the base B of transistor $T_1$ and —terminal of the power supply.

Figure 12:
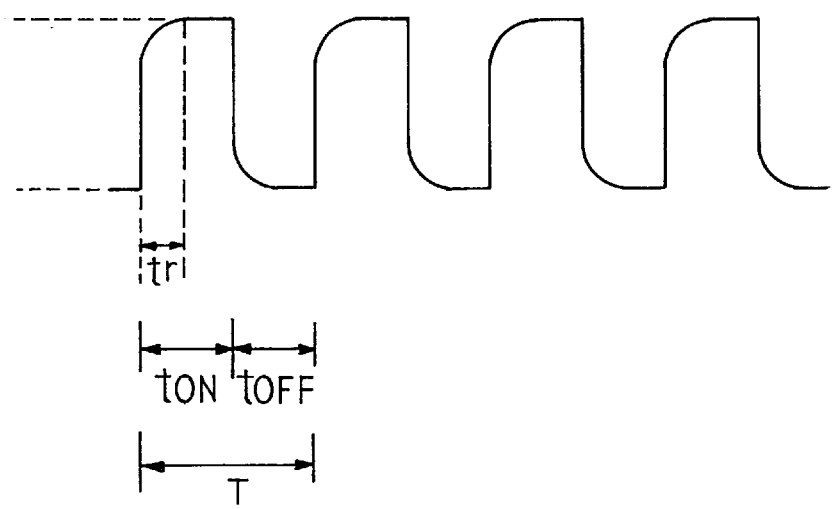
FIG. 12 is a timing chart showing the timing of application of the voltage to the halogen lamp L shown in the circuit of FIG. 11.

FIG. 12 is a timing chart showing the timing of application of the voltage to the halogen lamp L of the illuminating apparatus for a bicycle shown in FIG. 11.

Referring to the figure, in the circuit shown in FIG. 11, the capacitance of capacitor $C_1$ is set to be ten times that of the circuit shown in FIG. 1, and hence the frequency of the voltage applied to the halogen lamp L is reduced to one tenth, or about 70 Hz.

Further, since capacitor $C_3$ is connected, the time $t_r$ necessary for the rise of the voltage applied to the halogen lamp L is made longer than in the circuit of FIG. 1.

Therefore, by the circuit shown in FIG. 11, harmonic noise generated by the operation of the circuit can be reduced, and hence operation of other equipments of the bicycle, such as a cordless cycle computer is not affected.

In order to prevent harmonic noise, the frequency should be as low as possible. However, if the frequency is too low, intermittent on/off of the halogen lamp would be recognized by a person. Therefore, the frequency should be set to about 30 to 70 Hz.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A light emitting apparatus for a bicycle, comprising:
   pulse generating means for generating a pulse having a predetermined period and a predetermined duty cycle;
   light emitting means for emitting light when a voltage is applied; and
   voltage applying means responsive to said generated pulse for applying a voltage to said light emitting means;
   supplying means for supplying a voltage to said voltage applying means; and
   switching means for switching whether the voltage supplied from said supplying means is supplied through said voltage applying means to said light emitting means, or directly supplied to said light emitting means; wherein said predetermined period allows a person to visually recognize light emitted by said light emitting means as light emitted continuously.

2. The light emitting apparatus for a bicycle according to claim 1, further comprising adjustment means for adjusting said period and said duty cycle.

3. A light emitting apparatus for a bicycle, comprising:

pulse generating means for generating a pulse having a predetermined period and a predetermined duty cycle;

light emitting means for emitting light when a voltage is applied; and voltage applying means responsive to said generated pulse for applying a voltage to said light emitting means; and delay means for delaying time necessary for a rise of said pulse; wherein said predetermined period allows a person to visually recognize light emitted by said light emitting means as light emitted continuously.

4. The light emitting apparatus for a bicycle according to claim 3, wherein said delay means is formed of a capacitor.

5. The light emitting apparatus for a bicycle according to claim 3, wherein frequency of said pulse is in a range of from 30 to 70 Hz.

6. The light emitting apparatus for a bicycle according to claim 5, wherein said light emitting means includes a halogen lamp.

7. The light emitting apparatus for a bicycle according to claim 6, further comprising:

supplying means for supplying a voltage to said voltage applying means; and switching means for switching whether the voltage supplied from said supplying means is supplied through said voltage applying means to said light emitting means, or directly supplied to said light emitting means.

8. A light emitting apparatus for a bicycle, comprising:

pulse generating means driven by a single oscillator for generating a pulse having a predetermined period and a predetermined duty cycle;

light emitting means for emitting light when a voltage is applied; and voltage applying means responsive to said generated pulse for applying a voltage to said light emitting means; wherein said predetermined period allows a person to visually recognize light emitted by said light emitting means as light emitted continuously.

* * * * *